United States Patent
Hohmann et al.

(10) Patent No.: US 10,888,980 B2
(45) Date of Patent: Jan. 12, 2021

(54) ASSEMBLY COMPRISING A SUPPORT BRACKET, WHICH DIVERTS REACTION TORQUES, AND A POWER SCREWDRIVER

(71) Applicants: Jörg Hohmann, Meschede (DE); Frank Hohmann, Warstein (DE)

(72) Inventors: Jörg Hohmann, Meschede (DE); Frank Hohmann, Warstein (DE)

( * ) Notice: Subject to any disclaimer, the term of this patent is extended or adjusted under 35 U.S.C. 154(b) by 406 days.

(21) Appl. No.: 15/911,073

(22) Filed: Mar. 3, 2018

(65) Prior Publication Data
US 2018/0257204 A1  Sep. 13, 2018

(30) Foreign Application Priority Data
Mar. 9, 2017 (DE) .................. 10 2017 105 025

(51) Int. Cl.
   *B25B 23/00* (2006.01)
   *B25B 21/00* (2006.01)
   *B25F 5/00* (2006.01)
   *B25F 5/02* (2006.01)
   *F16H 57/02* (2012.01)

(52) U.S. Cl.
   CPC .......... *B25B 23/0078* (2013.01); *B25B 21/00* (2013.01); *B25F 5/001* (2013.01); *B25F 5/025* (2013.01); *F16H 57/02* (2013.01); *F16H 2057/02026* (2013.01)

(58) Field of Classification Search
   CPC ... B25B 23/0078; B25B 21/00; B25B 21/002; B25B 21/007; B25B 23/0007; B25B 23/0035; B25B 23/0042; B25F 5/001; B25F 5/025; F16H 57/02; F16H 2057/02026; B23P 19/06; E21B 19/16

USPC ..................................................... 81/57.24
See application file for complete search history.

(56) References Cited

U.S. PATENT DOCUMENTS

| 4,794,825 A | 1/1989 | Schmoyer |
| 6,715,381 B2 | 4/2004 | Junkers |
| 7,225,707 B2 * | 6/2007 | Knopp .................. B25B 21/00 81/57 |

(Continued)

FOREIGN PATENT DOCUMENTS

| DE | 10 2009 005 997 | 8/2010 |
| DE | 20 2013 004 157 | 8/2013 |

*Primary Examiner* — David B. Thomas
*Assistant Examiner* — Robert F Neibaur
(74) *Attorney, Agent, or Firm* — Gudrun E. Huckett

(57) ABSTRACT

A power screwdriver has a gear housing with forwardly extending output shaft and a peripheral external spline with teeth lying on a first diameter. The gear housing has a peripheral groove with groove bottom arranged rearward of the external spline. The groove bottom lies on a second diameter smaller than the first diameter. The support bracket has a fastening portion with an annular fastening flange with internal spline and a support foot arranged laterally offset from the output shaft and placed against an external counter bearing for diverting reaction torques. Internal and external splines cooperate to rotationally fix the support bracket relative to the gear housing. A locking element on the fastening flange can assume a blocking setting or a release setting. In the blocking setting, the locking element extends partially or completely into the groove and locks the support bracket to the gear housing in longitudinal direction.

4 Claims, 3 Drawing Sheets

(56) References Cited

U.S. PATENT DOCUMENTS

| | | | | |
|---|---|---|---|---|
| 7,451,672 B2* | 11/2008 | Junkers | ................ | B25B 21/004 |
| | | | | 81/180.1 |
| 7,832,310 B2* | 11/2010 | Junkers | .............. | B25B 23/0078 |
| | | | | 81/54 |
| 8,042,434 B2* | 10/2011 | Junkers | ................ | B25B 21/008 |
| | | | | 81/467 |
| 8,443,699 B2* | 5/2013 | Ha | ....................... | B25B 13/463 |
| | | | | 81/475 |
| 9,056,390 B2* | 6/2015 | Hellstrom | .......... | B25B 23/0078 |

* cited by examiner

ASSEMBLY COMPRISING A SUPPORT BRACKET, WHICH DIVERTS REACTION TORQUES, AND A POWER SCREWDRIVER

BACKGROUND OF THE INVENTION

The invention relates to an assembly comprising a support bracket, which diverts reaction torques, and a power screwdriver, which has a drive part and a gear housing having an output shaft extending forwardly out of the gear housing. Around the gear housing, an external spline is provided, the teeth of which extend rearward up to a groove surrounding the gear housing over the periphery thereof. The groove bottom of the groove lies on a diameter which is smaller than the diameter of the circle described by the tips of the teeth. The support bracket has a fastening portion having an annular fastening flange and an internal spline, and further has a support foot, which is arranged laterally offset from the output shaft and is placeable against an external counter bearing. The spline of the fastening flange cooperates with the spline of the gear housing such that the support bracket is rotationally fixed relative to the gear housing. On the fastening flange a locking element is arranged which can assume a blocking setting or a release setting, and the support bracket, in the blocking setting, is secured to the gear housing in the longitudinal direction.

During a screwing operation, power screwdrivers are generally held by a user via a handle. The often considerable reaction torque which is generated in the course of the screwing process can be diverted via a support bracket fastened in a rotationally secure manner to the power screwdriver. To this end, the support bracket must bear against an existing fixed component, for instance an adjacent screw connection, or be supported against the same. The adjacent screw connection then serves as a counter bearing. A transmission of reaction torques to the user of the power screwdriver, for example, via the handle, is thereby avoided. Often the generated reaction torques are difficult to estimate beforehand and can lead to an incalculable risk for the user, and perhaps cause kickback of the power screwdriver. The operational reliability of the power screwdriver is thus increased by an appropriate support bracket arrangement on the power screwdriver. In addition, this also produces a more comfortable usage of the power screwdriver.

For fastening such a support bracket to a power screwdriver, DE 10 2009 005 997 A1 discloses that the support bracket has an annular fastening flange having an internal toothing and can be pushed-fitted onto a gear housing surrounding the output shaft and having a corresponding external toothing. The support bracket is hence rotationally fixed in relation to the gear housing. For fixing the support bracket also in the longitudinal direction of the output shaft, a ball which is mounted such that it is radially displaceable is arranged, for example, in a tooth or tooth base of the internal toothing. A spring-loaded actuating pin receives the ball at least partially in a link. In the actuated state of the actuating pin, the ball wedges against the tooth flanks or tooth tips of the external toothing, and jams the gear housing axially in relation to the support bracket in this way.

A drawback in this context can be that fastening in the longitudinal direction is based solely on clamping or friction forces. There is hence the danger that, when appropriate compressive or tensile load is exerted by the bracket on the power screwdriver, the fastening setting is released, and the support bracket, together with fastening flange, slips off from the gear housing of the power screwdriver. Also, in such a fastening action based on clamping and friction forces, increased material wear through material abrasion occurs.

The object of the invention is to provide an assembly comprising a support bracket, which diverts reaction torques, and a power screwdriver, wherein the assembly enables a reliable, secure, and low-wear fastening of the support bracket to the power screwdriver.

SUMMARY OF THE INVENTION

This object is achieved in that an assembly of the aforementioned kind is characterized in that, in the blocking setting, the locking element extends partially or completely into the groove and locks in this way the support bracket to the gear housing in the longitudinal direction.

The assembly according to the invention firstly is comprised of a support bracket, which diverts reaction torques, and a power screwdriver. The power screwdriver has a drive part and a gear housing having an output shaft extending forwardly out of the gear housing. The power screwdriver can also have further components. These include a handle, in the case of an electrically driven power screwdriver a storage battery module, as well as control elements and visual and/or acoustic indicators. The invention is, however, also realizable on a pneumatically driven power screwdriver.

Around the gear housing, an external spline is arranged and provided with teeth which extend rearward up to a groove surrounding the gear housing over the whole of the periphery thereof. The groove bottom of the groove lies on a diameter which is smaller than the diameter of a circle described by the tooth tips of the external spline.

The support bracket has a fastening portion having an annular fastening flange and an internal spline, and has a supporting portion placeable against an external counter bearing and provided with a support foot which is arranged laterally offset from the output shaft. The internal spline on the fastening flange cooperates with the external spline on the gear housing such that the support bracket is rotationally fixed relative to the gear housing.

On the fastening flange, a locking element is arranged which can assume a blocking setting or a release setting. The support bracket, in the blocking setting, is secured to the gear housing in the longitudinal direction. In the blocking setting, the locking element extends at least partially into the groove and locks thereby the support bracket to the gear housing in the longitudinal direction, namely in a defined longitudinal position.

With the invention, a groove, which is often present anyway on the gear housing of power screwdrivers, is used to lock the support bracket in a distinct longitudinal position. In contrast to the solution from DE 10 2009 005 997 A1, the fastening action is thus not based on a purely non-positive jamming action and exhibits low wear even under long-term use. It is also conceivable to arrange a plurality of such fixing apparatuses over the circumference of the fastening flange, for instance in order to further improve the positive locking action.

According to a preferred embodiment of the invention, the locking element is a component part of a fixing apparatus further comprising an actuating element, wherein the actuating element is a pin, which is arranged in a tangentially displaceable manner within the fastening flange and is pretensioned against a compression spring. The pin has a link or recess for the partial reception of the locking element in the release setting. As a result of the tangential arrangement of the actuating element or pin, the accessibility of the pin when it is to be actuated by the user is facilitated. From the prior art, an axial arrangement of such a pin is known. Depending on the screwing situation, this can result in more difficult accessibility of the pin. The actuation of the pin can also become necessary in an acute screwing situation, for instance, for readjustment of the support bracket. In particular in cramped spatial conditions, it is then advantageous to be able to actuate the pin from the side.

According to a further embodiment of the invention, it is advantageous that the actuating element is comprised of the pin, which is guided in a bore of the fastening flange, and a widened head, which forms the pin end. As a result of the two-part nature of the actuating element, on the one hand, a neat guidance of the actuating element in the bore is ensured, yet, on the other hand, also easy operability from outside. The pin and the head can be formed in one piece, or can be screwed together, for instance. Thus the head can have a bore having an internal thread into which the pin is screwed with an external thread.

It is also advantageous when the compression spring is supported with a first spring end against that end of the pin which is facing away from the head, and, with a second spring end, against a plug which closes off the bore to the outside. The supporting action of the compression spring against an end of the pin is essential to the assembly according to the invention. Only in this way, the locking element in the blocking setting can engage at least partially the groove. The spring force by itself thus holds the pin in the position necessary for the blocking setting of the fixing apparatus. The further supporting action of the compression spring against a plug which closes off the bore to the outside is advantageous inasmuch as, upon removal of the plug, both the compression spring and the pin or locking element can be easily removed from the bore and, for example, exchanged. In addition, further ducts or bores, which run outwards from the bore, and which are likewise sealable with plugs, can be provided.

According to a further embodiment of the invention, the plug is pressed into the bore or fastened therein by screwing. This enables a simple and rapid removal of the plug as and when required, for instance when the pin, the locking element or the compression spring must be removed from the bore for maintenance purposes, and/or exchanged. Naturally, further bores which are arranged in the fastening flange, and which are connected to the guide bore of the pin, can also be sealed with plugs that are pressed or screwed into the respective bore.

BRIEF DESCRIPTION OF THE DRAWINGS

Further details and advantages of the invention emerge from the following description of the associated drawings, in which an illustrative embodiment of the assembly according to the invention is represented.

DESCRIPTION OF PREFERRED EMBODIMENTS

Figure 1:
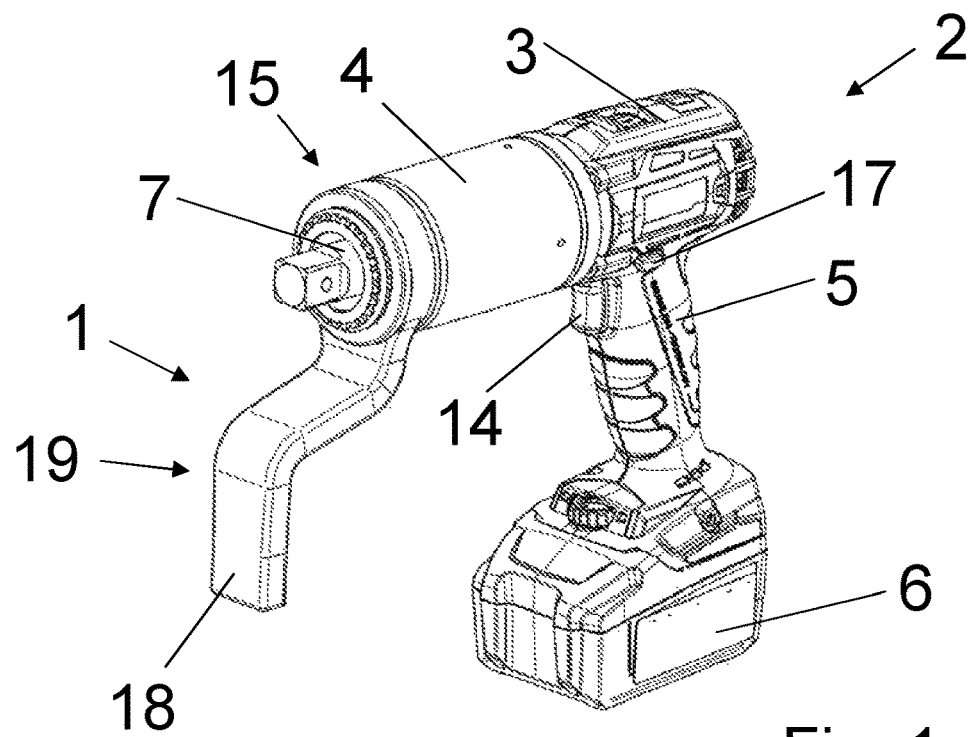
FIG. 1 shows a schematic representation of an assembly comprising a power screwdriver and a support bracket fastened thereto.

Component parts of the assembly according to the invention are a power screwdriver 2 and a support bracket 1 which absorbs screwdriving torques. FIG. 1 shows a corresponding power screwdriver 2 having a support bracket 1 fastened thereto. The power screwdriver 2 is comprised firstly of a drive part 3 and a gear housing 4. The two components can also be connected to each other, for example, via a swivel joint.

In the drive part 3, a motorized device can be provided for the operation of the power screwdriver 2. In principle, a pneumatic or electric operating method can also be considered. Moreover, close to the drive part 3, a handle 5 and a storage battery 6 or other battery can be provided. Such a storage battery (rechargeable battery) 6 can be exchangeably fastened to the power screwdriver 2. The storage battery 6 provides the required electrical energy for the operation of the power screwdriver 2. Naturally, such a power screwdriver 2 can also be supplied with electrical energy via an appropriate cable connection. Within the gear housing 4, transmission components, for example, a torque converter and a gear mechanism, necessary for the operation of the power screwdriver 2 can also be arranged. A fundamental component part is also an output shaft 7 which extends forwardly out of the gear housing 4. This output shaft 7 terminates at its front end with a polygon 12 for attaching a tool.

For the operation of the power screwdriver 2, the user holds the power screwdriver 2 in his hand by the handle 5. The activation of the power screwdriver 2 or control of the screwing operation takes place primarily by actuation of an appropriate switch 14. Via an additional switch 17, the direction of rotation of the output shaft 7 can be reversed.

As can likewise be seen in FIG. 1, a support bracket 1 can be fastened to the power screwdriver 2 or to the front end of the gear housing 4. In essence, the support bracket 1 is arranged laterally offset from the rotational axis of the output shaft 7. The support bracket 1 comprises a fastening portion 15 having an annular fastening flange 16 and further comprises a supporting portion 19 having a support foot 18 to be placed against an external counter bearing. The external counter bearing can be formed by other machine parts or components, for instance an adjacent nut of a screwed connection.

Figure 2:
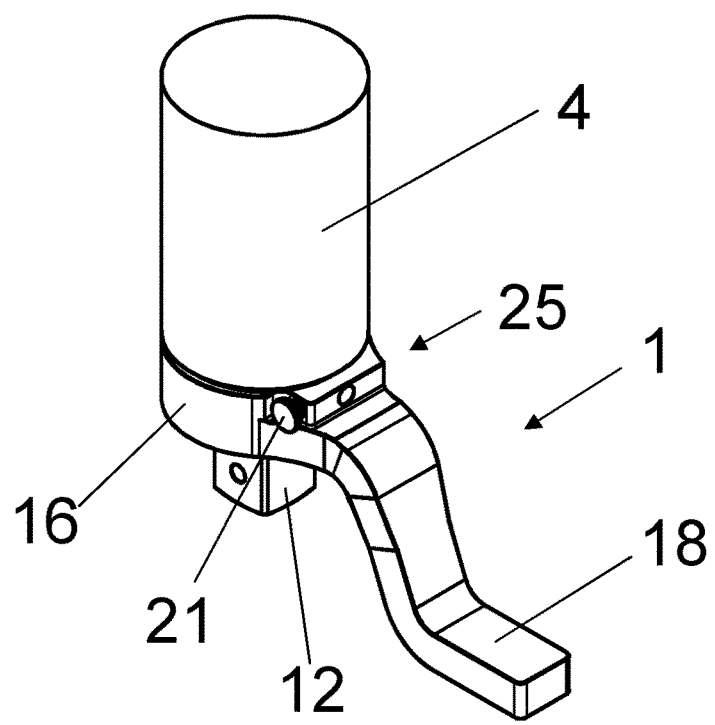
FIG. 2 shows a schematic representation of the gear housing of the power screwdriver, together with support bracket fastened thereto.
Figure 3:
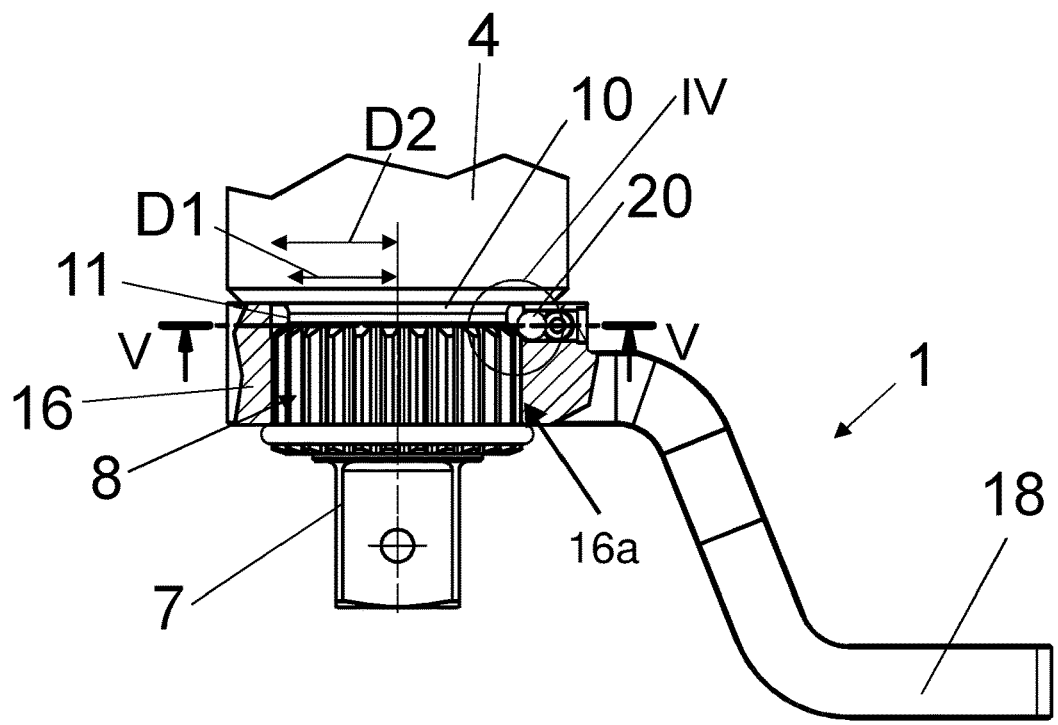
FIG. 3 shows an enlarged side view of the fastening region between support bracket and gear housing.

As can be seen, in particular, in FIGS. 2 and 3, a fixing apparatus 25 comprising a locking element 20 and an actuating element 21 is arranged on the fastening flange 16. The actuating element 21 is arranged in the fastening flange 16 such that it is displaceable tangentially, thus transversely, to the rotational axis of the output shaft 7. A displacement of the actuating element 21 can be generated by actuation of a radially widened head 37 of a pin 31 forming the actuating element 21.

The actuating element 21 is preferably of two-part configuration, i.e. it consists of a pin 31, which is guided in a bore 36 of the fastening flange 16, and a widened head 37, which forms the pin end.

Figure 4:
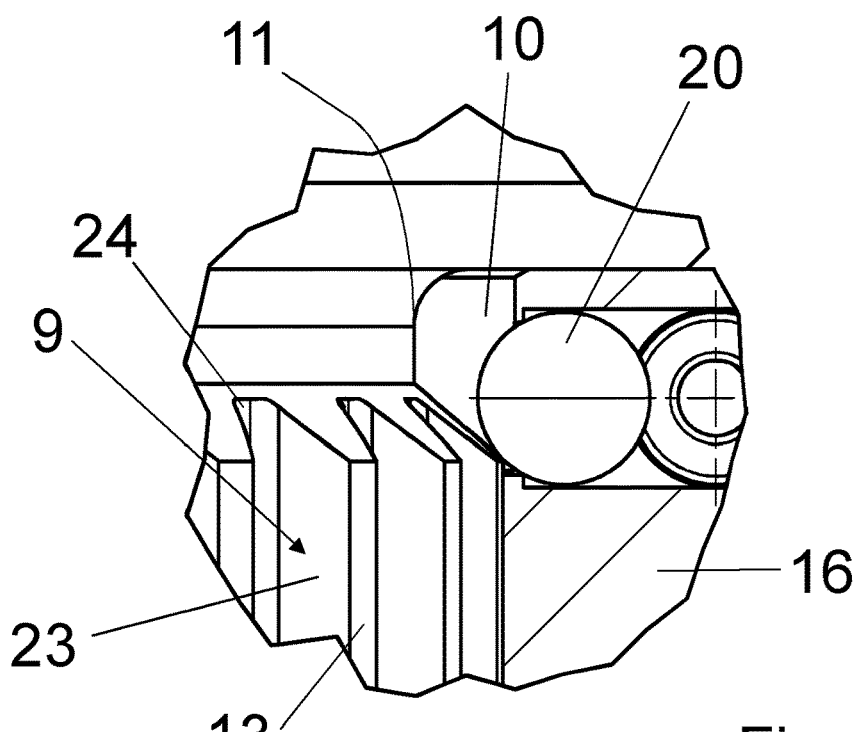
FIG. 4 shows an enlarged detailed view of the detail IV of FIG. 3.

From FIG. 3 and FIG. 4 it is evident that around the gear housing 4 an external spline 8 is arranged that is provided with teeth 9 extending rearwardly, thus in the direction toward the drive part 3, up to a groove 10 surrounding the gear housing 4 over the entire periphery thereof. The groove bottom 11 of the groove 10 here lies on a diameter D1 which is smaller than the diameter D2 of the circle described by the tips 13 of the teeth 9. The spline 8 is an array of individual teeth 9 arranged circumferentially around the gear housing 4, wherein the teeth 9 all extend in the longitudinal direction. The individual teeth 9 are respectively formed by tooth flanks 23 and a tooth tip 13. The teeth 9 are separated by interspaces and tooth bases 24.

Similarly, an internal spline 16a is arranged on the annular fastening flange 16. This internal spline 16a (only schematically indicated in FIG. 3) cooperates with the external spline 8 of the gear housing 4 such that the support bracket 1 is rotationally fixed relative to the gear housing 4. In concrete terms, this means that the teeth of the internal spline of the fastening flange 16 engage notches located between the individual tooth flanks 23 of the teeth 9 of the external spline 8 of the gear housing 4, and vice versa.

According to the invention, the fixing apparatus 25 can assume a blocking setting or a release setting, wherein the support bracket 1, in the blocking setting, is secured to the gear housing 4 in the longitudinal direction of the output shaft 7. To this end, the locking element 20, preferably a ball, extends in the blocking setting of the fixing apparatus 25 at least partially into the groove 10 (FIG. 4). At least in part, the locking element 20 however remains in the fastening flange 16 also in the blocking setting.

In order to reach from the blocking setting the release setting of the fixing apparatus 25, in which the support bracket 1 or the fastening flange 16 can be pulled off the gear housing 4, an actuating element 21 has to be actuated by the user. As represented, in particular, in FIG. 5, the actuating element 21 is a pin 31 arranged within the fastening flange 16 such that it is displaceable tangentially to the rotational axis of the power screwdriver; the pin 31 is pretensioned against a compression spring 30. The pin 31 has a link or recess 35.

Preferably, the actuating element 21 is comprised of a pin 31, which is guided in a bore 36 of the fastening flange 16, and a widened head 37, which forms the pin end of the actuating element 21. Pin 31 and head 37 are preferably of two-part configuration, but can also be of single-part or one-piece configuration. The head 37 is widened, for instance radially widened, in comparison to the pin 31. The radially widened part of the head 37 lies outside the bore 36 of the fastening flange 16 and can be actuated by a user.

Figure 5:
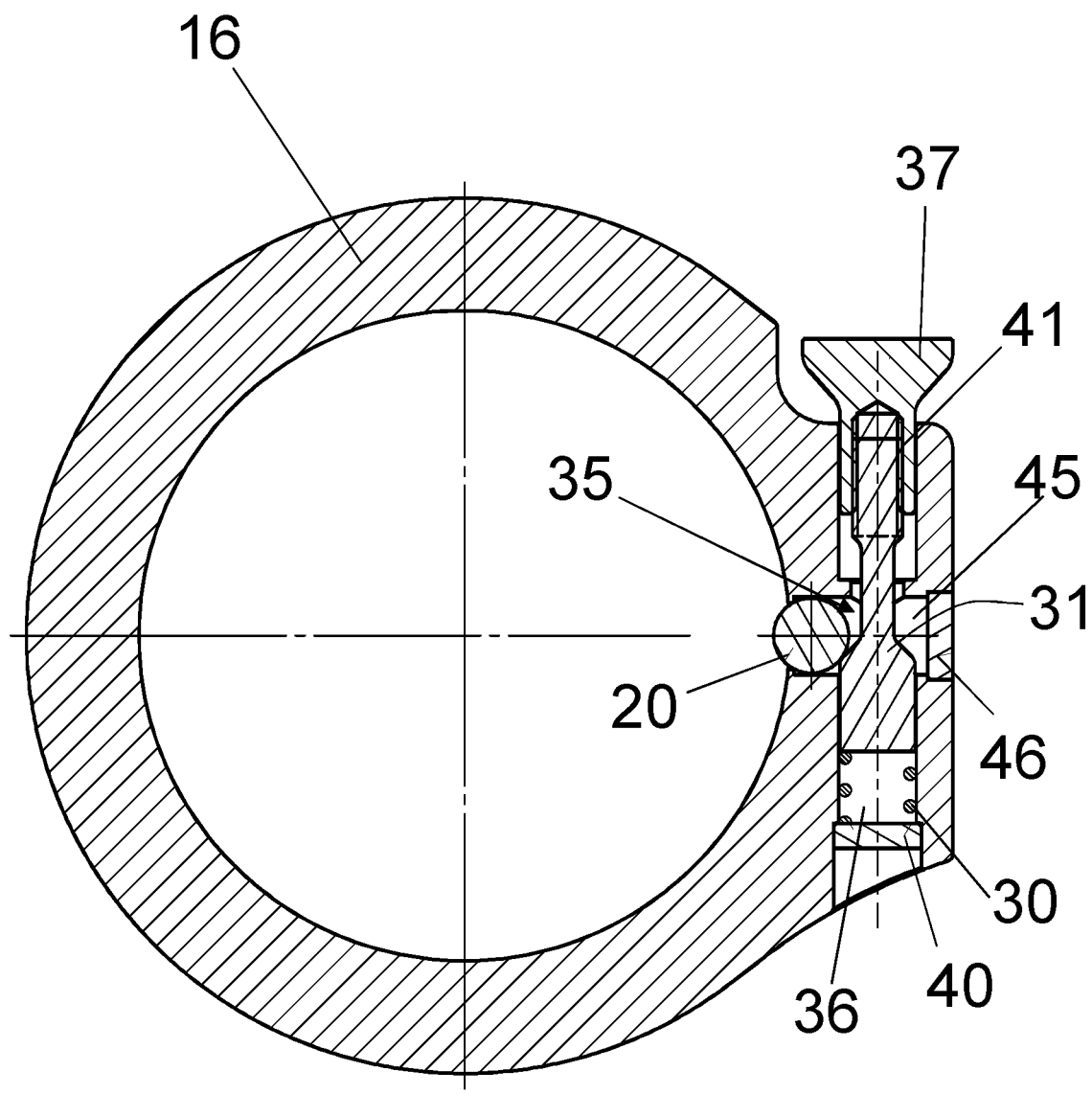
FIG. 5 shows a cross section through the fastening flange according to section line V-V in FIG. 3.

As is shown by FIG. 5, the head 37 can receive the pin 31 in a bore 41 of the head 37, for example, by a screw connection. Thus pin 31 and head 37 are in operative connection. Upon actuation of the actuating element 21, thus of the head 37, the pin 31 is forced counter to the force of a spring 30 into the bore 36. Against that end of the pin 31 which is facing away from the head 37, a compression spring 30 is supported; the other spring end is supported against a plug 40 which seals the bore 36 to the outside. The plug 40 can be pressed into the bore 36, or fastened by screwing. In the case of a screw connection, the plug 40 has an appropriate external thread, and the bore 36 comprises a corresponding internal thread.

In addition, the fastening flange 16 can be provided with further openings, which allow access to the bore 36 from outside. Thus, an appropriate opening 45 can be arranged to the side of the pin 31 in the fastening flange 16. This bore 36 can be sealed also with a plug 46. When the plugs 40, 46 are removed, the components, in particular the compression spring 30, the actuating element 21, and the locking element 20, disposed within the bore 36 or in the fastening flange 16 can be removed from the bore 36 or the flange 16 and exchanged. This is advantageous, in particular for maintenance purposes.

In FIG. 5, the fastening flange 16, together with fixing apparatus 25, is represented in the sectional plane V-V according to FIG. 3. The direction of view which is to be taken into account is identified by appropriate arrows in FIG. 3. In the representation according to FIG. 5, the fixing apparatus 25 is in its blocking setting. When the actuating element 21 is actuated, the head 37, together with pin 31, moves in the direction of the compression spring 30. After this, the compression spring 30 is compressed and the locking element 20 or the ball can slide back into the link or recess 35 of the pin 31. In this release setting, the locking element 20, in contrast to the blocking setting, no longer extends into the groove 10 of the gear housing 4. The support bracket 1 can be pulled off from the power screwdriver 2 in the longitudinal direction of the output shaft 7. In the blocking setting, this movement is not possible, since the locking element 20 or the ball, since it is partially extending into the groove 10, engages across the rear tooth ends and locks the support bracket 1 in relation to the gear housing 4 or the power screwdriver 2 in a distinct longitudinal position, namely by form fit. The locking element 20 and the actuating element 21 can be made of the same material or of different materials. In particular, the locking element 20 and the actuating element 21 can be made of metal.

The specification incorporates by reference the entire disclosure of German priority document 10 2017 105 025.6 having a filing date of 9 Mar. 2017.

While specific embodiments of the invention have been shown and described in detail to illustrate the inventive principles, it will be understood that the invention may be embodied otherwise without departing from such principles.

LIST OF REFERENCE CHARACTERS 1 support bracket
2 power screwdriver
3 drive part
4 gear housing
5 handle
6 storage battery
7 output shaft
8 external spline
9 tooth
10 groove
11 groove bottom
12 polygon
13 tip
14 switch
15 fastening portion
16 fastening flange
17 switch
18 support foot
19 supporting portion
20 locking element
21 actuating element
23 tooth flank
24 tooth base
25 fixing apparatus
30 compression spring
31 pin
35 recess
36 bore
37 head
40 plug 41 bore
45 opening
46 plug
D1 diameter
D2 diameter

What is claimed is:

1. An assembly comprising:
a support bracket (1) configured to divert reaction torques;
a power screwdriver (2) comprising a drive part (3) and a gear housing (4) comprising an output shaft (7) extending forwardly out of the gear housing (4) in a longitudinal direction of the output shaft (7);
the gear housing (4) comprising an external spline (8) extending peripherally around the gear housing (4), wherein the external spline (8) comprises teeth (9) with tips lying on a circle of a first diameter;
the gear housing (4) comprising a peripheral groove (10) arranged rearwardly of the external spline (8) and extending about a periphery of the gear housing (4), wherein the peripheral groove (10) comprises a groove bottom (11) and the groove bottom (11) lies on a second diameter (D1) which is smaller than the first diameter (D2), wherein the teeth (9) extend rearwardly up to the peripheral groove (10);
the support bracket (1) comprising a fastening portion (15) and further comprising a support foot (18), wherein the fastening portion (15) comprises an annular fastening flange (16) comprising an internal spline (16a);
the support foot (18) arranged laterally offset from the output shaft (7) and configured to be placed against an external counter bearing;
the internal spline (16a) of the annular fastening flange (16) cooperating with the external spline (8) of the gear housing (4) such that the support bracket (1) is rotationally fixed relative to the gear housing (4);
a fixing apparatus comprising a locking element (20) arranged on the annular fastening flange (16) and configured to assume a blocking setting or a release setting, wherein, in the blocking setting, the locking element (20) extends partially or completely into the groove (10) and locks the support bracket (1) to the gear housing (4) in the longitudinal direction;
the fixing apparatus further comprising an actuating element (21) and a compression spring (30), wherein the actuating element (21) comprises a pin (31) comprising a longitudinal axis, wherein the longitudinal axis is arranged tangentially relative to the annular fastening flange (16) and wherein the pin (31) is displaceable in a direction of the longitudinal axis and tangentially to the annular fastening flange (16) in the annular fastening flange (16), wherein the pin (31) is pretensioned against the compression spring (30) arranged at a first end of the pin (31) in the longitudinal direction, wherein the pin (31) comprises a recess (35), wherein the recess (35) extends in a radial direction relative to the longitudinal axis and is configured to partially receive the locking element (20) in the release setting.

2. The assembly according to claim 1, wherein the actuating element (21) further comprises a widened head (37) connected to a second end of the pin (31) opposite the first end, wherein the pin (31) is guided in a bore (36) of the fastening flange (16).

3. The assembly according to claim 2, wherein the compression spring (30) is supported with a first spring end against the first end of the pin (31) facing away from the widened head (37) and is supported with a second spring end opposite the first spring end against a plug (40) closing off the bore (36) of the annular fastening flange (16) in an outward direction.

4. The assembly according to claim 3, wherein the plug (40) is pressed into the bore (36) or fastened in the bore (36) by screwing.

* * * * *